(12) United States Patent
Fukuda et al.

(10) Patent No.: US 6,631,105 B1
(45) Date of Patent: Oct. 7, 2003

(54) DISK REPRODUCING SPEED CONTROL METHOD AND A DISK REPRODUCING APPARATUS USING THIS METHOD

(75) Inventors: Hirotoshi Fukuda, Chigasaki (JP); Kazunaga Narita, Yokohama (JP); Kiyonobu Teramoto, Yokohama (JP); Hirohito Ishibashi, Yokohama (JP); Toshihiro Matsunaga, Fujisawa (JP); Masato Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/558,157

(22) Filed: Apr. 26, 2000

Related U.S. Application Data

(63) Continuation of application No. 08/899,335, filed on Jul. 23, 1997, now Pat. No. 6,351,440.

(30) Foreign Application Priority Data

Jul. 24, 1996 (JP) .............................. 8-194338
Nov. 5, 1996 (JP) .............................. 8-292652

(51) Int. Cl.⁷ .............................................. G11B 7/00
(52) U.S. Cl. ................. 369/47.44; 369/53.3; 369/47.38
(58) Field of Search ........................ 369/47.36, 47.38, 369/47.44, 53.12, 53.14, 53.18, 53.42, 47.45, 53.13, 53.3, 53.37

(56) References Cited

U.S. PATENT DOCUMENTS 4,872,154 A * 10/1989 Sakagami et al. ........ 369/53.36
4,984,227 A    1/1991 Yoshimaru
5,157,513 A   10/1992 Yamashita .................... 369/50
5,270,992 A   12/1993 Yasuda et al. ................ 369/50
5,276,569 A    1/1994 Even ........................ 360/73.03
5,285,141 A    2/1994 Hwang ...................... 360/73.03
5,313,567 A    5/1994 Civanlar et al.

(List continued on next page.)

FOREIGN PATENT DOCUMENTS

| JP | 60-045946 | 3/1985 |
| JP | 62-82559  | 4/1987 |
| JP | 2-94030   | 4/1990 |
| JP | 4-28082   | 1/1992 |
| JP | 4-143928  | 5/1992 |
| JP | 07073571  | 3/1995 |
| JP | 08055422  | 2/1996 |

*Primary Examiner*—Thang V. Tran
*Assistant Examiner*—Bach Vuong
(74) *Attorney, Agent, or Firm*—Antonelli, Terry, Stout & Kraus, LLP

(57) ABSTRACT

When a deviated gravity disc is reproduced at a higher rate with the disc reproducing apparatus, an excessive vibration is generated and this vibration gives adverse effect on the disc reproducing apparatus and peripheral components/apparatuses, and/or may represent an annoyance to a user. A vibration information detector for detecting vibration of the disc reproducing apparatus or a deviated gravity information detector for detecting amount of gravity deviation of disc is provided, and as a result of such detection of an imbalance (i.e., excessive vibration or mass eccentricity), and a reproducing rate switching control controls sets and limits the reproducing rate of the disc reproducing apparatus to a substitute speed which is lower or higher than a normal reproducing speed.

16 Claims, 8 Drawing Sheets

U.S. PATENT DOCUMENTS

| | | | |
|---|---|---|---|
| 5,348,783 A | 9/1994 | Ohno et al. .................... | 369/50 |
| 5,375,112 A * | 12/1994 | Togawa ................... | 369/53.29 |
| 5,448,687 A | 9/1995 | Hoogerhyde et al. | |
| 5,497,276 A | 3/1996 | Kakuda ....................... | 369/50 |
| 5,542,036 A | 7/1996 | Schroeder et al. | |
| 5,566,282 A | 10/1996 | Zuiderveld | |
| 5,583,975 A | 12/1996 | Naka et al. | |
| 5,594,844 A | 1/1997 | Sakai et al. | |
| 5,598,303 A | 1/1997 | Jones et al. .............. | 360/73.03 |
| 5,619,968 A | 4/1997 | Hillsberg et al. | |
| 5,636,193 A | 6/1997 | Ohmi ......................... | 369/50 |
| 5,691,968 A | 11/1997 | Tomishima et al. | |
| 5,740,356 A | 4/1998 | Liang et al. ................... | 369/53 |
| 5,751,676 A | 5/1998 | Kusano et al. ................ | 369/50 |
| 5,805,548 A | 9/1998 | Ishihara et al. ............... | 369/50 |
| 5,808,990 A | 9/1998 | Summers ..................... | 369/50 |
| 5,815,478 A | 9/1998 | Kim ............................ | 369/50 |
| 5,835,463 A | 11/1998 | Teshirogi et al. ............. | 369/50 |
| 5,844,866 A | 12/1998 | Fujimoto et al. ............. | 369/50 |
| 5,844,872 A | 12/1998 | Kubo et al. ................... | 369/50 |
| 5,862,113 A | 1/1999 | Tsuyuguchi et al. .......... | 369/50 |
| 5,920,531 A * | 7/1999 | Tamura et al. ........... | 369/47.46 |
| 5,963,517 A * | 10/1999 | Nakagaki et al. ........ | 369/53.14 |
| 6,118,739 A * | 9/2000 | Kishinami et al. ....... | 369/44.28 |

* cited by examiner

DISK REPRODUCING SPEED CONTROL METHOD AND A DISK REPRODUCING APPARATUS USING THIS METHOD

CROSS-REFERENCE TO RELATED APPLICATIONS

This is a continuation of U.S. Ser. No. 08/899,335 filed Jul. 23, 1997 and issued as U.S. Pat. No. 6,351,440.

BACKGROUND OF THE INVENTION

1. Field of the Invention

The present invention generally relates to a disc reproducing method and apparatus which utilize a disc motor for rotating a disc and an optical pickup to realize high speed reproduction, and more particularly relates to a disc reproducing method and apparatus which are suitable for prevention of excessive oscillation and/or vibration in a radial direction of a disc during high speed rotation resulting from an imbalance (e.g., disc eccentricity imbalance, mass imbalance, etc.).

2. Description of Related Art

Use of a so-called compact disc—read only memory (CD-ROM) apparatus (utilizing CD-ROM's as recording/reproduction medium) as a peripheral device of a personal computer has gained in popularity and frequency in recent years. Since introduction, whereupon the CD-ROM apparatus was standardized to operate at a predetermined 1×speed or rate, technology has advanced tremendously, leading to ever increasing operating speeds for the CD-ROM apparatus, i.e., for realization of higher speed data transfer rates. Recently, an 8×speed (i.e., 8 times the original standardized 1×speed) is commonplace, and it is now estimated that high speed data transfer of a 12×speed or higher will become commonplace in the near future.

For background discussion, FIG. 7 shows a schematic basic block diagram of a servo system used for disc motor control of a disc reproducing apparatus. More particularly, the FIG. 7 arrangement may be dedicated to reproduce only CD-ROMs on which the information of a computer (hereinafter called CD-ROM information) is recorded, or may also be able to reproduce CDs on which audio information is recorded. If the disc 1 is a CD, the rotational speed is uniquely defined, however, if the disc 1 is a CD-ROM, for example, it can be reproduced at a multiplicity of different speeds, e.g, X times as high as a standardized rotational speed of 1.2 m/sec. More particularly, as described above, recently reproduction at an 8× or 12×rate is mainstream.

Within FIG. 7, the information reader 4 (i.e., head arrangement including a laser, lenses, sliders, actuators, etc.) converts information recorded on a disc 1 into an electrical signal and then inputs the signal to a demodulating circuit 6. The demodulating circuit 6 demodulates the electrical signal and a signal processing circuit 7 generates a clock signal from the demodulated signal. A disc motor servo circuit 8 controls the rotating speed of a disc motor 2 via the disc motor driving circuit 3 so that the clock signal becomes equal to a reference clock signal generated by a reference clock generating circuit 9.

FIG. 8 shows relationship between a disc reproducing rate multiplication ratio according to a reproducing position and a disc rotating speed. The recording/reproducing system of this exemplary CD-ROM is a constant linear velocity (CLV) system in which linear speed is set to a constant value. In this system, a rotating speed of the disc changes depending on a current reproducing position of the head on the disc. In such discussed CLV system, since a reference rotating speed is 1.2 m/sec in a standard reproducing rate (i.e., in a 1×original standard speed) and a signal recording area of a disc is within a disc region from 25 mm to 58 mm in a radius direction from a center of the disc, for a 4× (i.e., 4-fold) reproducing operation, the rotating speed (frequency) at an innermost position of the 25 mm radius is about 32 Hz as can be seen from the characteristic curve 30 in FIG. 8. Similarly, in an 8× (i.e., 8-fold) reproducing operation, the maximum rotating speed is about 64 Hz as can be seen from the characteristic curve 31, and in the 12× (i.e., 12-fold) reproducing operation, the maximum rotating speed is about 96 Hz as can be seen from the characteristic curve 32.

Turning discussion now to FIG. 9, at times, a certain disc 1 which is loaded into and attempted to be reproduced (i.e., read) by a disc reproducing apparatus may have a center of rotation 33 (which is the center of disc 1) which is deviated from a center of gravity or center of mass point 34. Such disc situation is hereinafter called a deviated gravity disc. Such deviated gravity disc may be generated during manufacturing, for example, because a disc material pressure is uneven, an unbalanced paint distribution is applied to a surface of the disc, or by reason that an index label is attached on the disc surface after manufacturing thereby to imbalance the disc. When this deviated gravity disc 1 is rotated around the center 33, a force indicated by a force vector 35 is generated at the point 33, in a direction of the point 34. Therefore, when this deviated gravity disc 1 is reproduced by the disc reproducing apparatus, the force 35 works on the disc, disc clamp/mount and disc motor during rotation to fling the disc side to side, and vibration may be generated in a direction matching a major plane of the disc reproducing apparatus. Such situation is called a mass eccentric disc.

The above-mentioned force 35 increases in proportion to a square of the disc rotating speed. Namely, during a reproducing operation in the 8×reproducing rate, a force equal to 4 times that in the 4×reproducing rate is generated, and during a reproducing operation in the 12×reproducing rate, a force equal to 9 times that of the 4×reproducing rate is generated. Therefore, with improvement in a disc reproducing rate (i.e., rotating speed) of the disc reproducing apparatus, vibration generated when a deviated gravity disc is reproduced becomes large. Such vibration can result in a failure of operation (e.g., burn out, mis-reading, etc.) of the disc reproducing apparatus, can have an adverse effect on components installed in close proximity to the vibrating disc, a noise generated therefrom can be an annoyance to a user, and/or vibration can cause the disc reproducing apparatus to move across a surface on which it is placed.

The above-discussed vibration phenomenon is due to a mass eccentricity imbalance of the disc, causable (i.e., presently causing or capable of causing) of at least one of a radial oscillation and radial vibration above a predetermined rotational speed, i.e., oscillation/vibration directed along a radial direction (i.e., in a major plane) of the disc so as to cause a disc to fling side-to-side as the disc is rotated. Such mass eccentricity imbalance is the imbalance of most interest in the present invention. Another imbalance of interest to a smaller degree is a centering eccentricity imbalance, i.e., a centering eccentricity imbalance of the disc, causable of at least one of a radial oscillation and radial vibration above a predetermined rotational speed, i.e., oscillation/vibration directed along a radial direction (i.e., in a major plane) of the disc so as to cause a disc to fling side-to-side as the disc is rotated. Centering eccentricity imbalance results, for example, when a disc is loaded with its disc center misaligned to a center of a rotator arrangement (i.e., rotating motor, disc mount/clamp, etc.). Misalignment may be due to sloppy loading of the disc to the mount/clamp, excessively sized central mounting hole in the disc, excessively small or worn mount/clamp, etc. Centering eccentricity imbalance affects oscillation/vibration and operation of the disc reproducing apparatus to a lesser degree than that of mass eccentricity imbalance. However, the principles and arrangements of the present invention are equally applicable to centering eccentricity imbalance as mass eccentricity imbalance.

Continuing in discussion, FIG. 14 is a block diagram showing another CD/CD-ROM disc reproducer arrangement, and in greater detail. More particularly, a reference number 1 denotes a disc, T denotes a track or tracks, L denotes a beam (e.g., laser beam), 2 denotes a disc motor, 3 denotes a disc motor driver or control circuit, 4 denotes a head arrangement or information reader, 40 denotes a preamplifier circuit, 5 denotes a tracking driver or control circuit, 7 denotes a signal processing circuit, 50 denotes a CPU, 10 denotes an audio circuit, 11 denotes an audio signal output terminal, 12 denotes a CD-ROM decoder and 13 denotes a CD-ROM signal output terminal. More particularly, the FIG. 14 arrangement can be used to reproduce both CDs and CD-ROMs as was discussed above with respect to the arrangement of FIG. 7. CPU 50 receives a request along an input line 1 from an external device such as a host computer, issues an instruction A for rotational speed to a disc motor control circuit 3 in response to this request, and sets the rotational speed of the disc 1 to a speed requested from the external device.

Helical or concentric tracks T where information is recorded are formed on the disc 1, and an information reader 4 reads audio information or CD-ROM information from any selected track T by radiating a beam L (e.g., a laser beam) on this track T and outputs reflected read information as a read signal. After this read signal is amplified and the waveform is shaped by a preamplifier circuit 40, the signal is supplied to a signal processing circuit 7, and predetermined processing is applied to the signal. More particularly, if the read signal is an audio information signal, the signal is further processed in an audio circuit 10, or if the read signal is a CD-ROM information signal, it is processed in a CD ROM decoder 12, and output from output terminals 11 and 13, respectively.

The head arrangement or information reader 4 may be constituted by laser, lenses, a pickup, a main actuator/slider for coarsely moving the pickup for major distances (i.e., across tracks) in the radial direction of the disc 1, a minor actuator/slider for finely moving the pickup for minor distances (i.e., precisely aligning to a particular track) in the radial direction of the disc 1, a focusing actuator/slider for focusing the laser beam L onto a track surface of the disc, and may have additional components. A beam L from the pickup can sequentially radiate a series of tracks T owing to movement of the actuators/sliders as the disc 1 is rotated. The disc reproducer is further provided with a tracking control circuit 5 for controlling a position of this condenser in the direction of the width of the track T so as to let a beam L follow the track T, and other components. A part of a read signal amplified by the preamplifier circuit 40 is supplied to a tracking driver or control circuit 5. This tracking control circuit 5 detects a state in which a beam L is following the track T based upon the supplied read signal and generates a tracking control signal B according to the result of detection. The tracking control of the pickup of the information reader 4 is controlled by this tracking control signal B so that a beam L always precisely follows the track T.

To access a desired track T, CPU 50 outputs an inhibiting signal C to stop the operation of the tracking control circuit 5 so that a tracking control signal B is prevented from being output and moves the pickup of the information reader 4 in the radial direction of the disc 1 at high speed by the slider so that a beam L is radiated upon this desired track T. This allows a beam L to cross plural tracks causing a read signal outputted from the information reader 4 to be a pulse signal having an amplitude which fluctuates or pulses every time the beam L crosses a track, which pulse signal is called a track crossing pulse hereafter. The track crossing pulse D is detected by and supplied from the preamplifier circuit 40 to CPU 50. CPU 50 recognizes the number of tracks which the beam L crosses by counting a number of track crossing pulses D and determines whether a beam L has reached a desired track or not.

When the tracking control circuit 5 supplies a tracking control signal B to the information reader 4, the tracking control arrangement is controlled and a beam L follows the track T with the pickup theoretically stopped opposing a desired track in this information reader 4. However, in practice stopping the pickup opposed to a desired track may not be practical because a track location may oscillate (due to eccentricity as described above and below) and because there is a limit in the quantity of displacement (fine adjustment) of a beam L by the tracking arrangement. Accordingly, in a practical situation, the pickup is typically adjustingly moved in the radial direction of the disc by the actuators/sliders and tracking arrangement periodically, i.e., the pickup is intermittently moved in the radial direction of the disc 1.

If such a mass eccentric disc is rotated at a low rotational speed, for example, a 1×speed, oscillation may hardly occur because rotational speed is slow. However, when rotational speed is increased to a high rotational speed, for example 8× or 12× (in order to accomplish high speed reproduction), the disc reproducer may experience oscillation/vibration and track eccentricity in a direction parallel to a major plane of the disc. More particularly, oscillation/vibration and track eccentricity may be only experienced or increased as rotational speed is increased. For track eccentricity below a predetermined value, tracking control and track following can still be accomplished, but if above the predetermined value, tracking control and track following cannot be accomplished. Though it varies depending upon the quantity of mass eccentricity, according to experiments, when reproduction is executed at approximately a 6×rate or more, oscillation/vibration, track eccentricity and noise occurs. Therefore, in the case of reproduction of a mass eccentric disc at an 8×rate which is the recent mainstream, a large oscillation/vibration, track eccentricity and noise are generated by the disc reproducer, undesirable oscillation may be applied to components installed in close proximity to the disc, and such oscillation may have a detrimental effect upon components of and work around this disc reproducer.

As an example of a detrimental effect on a particular component, in a pickup, a condenser is normally held by an elastic member and the position of this condenser is controlled according to a tracking control signal supplied to tracking arrangement so that a beam follows (that is, tracks) a track. However, when this tracking control is stopped, the condenser held by the elastic member is oscillated by and in synchronization with the disc imbalance vibration. When a disc reproducer is oscillated by the rotation of a mass eccentric disc at low rotational speeds, the free condenser is oscillated slightly at the same phase as this disc reproducer because the disc oscillation is small. However, when the rotational speed of the disc is increased, the amplitude/ frequency of oscillation generated in the disc reproducer is increased, and the condenser is oscillated at a frequency according to the transfer function proper to the elastic member holding the condenser.

SUMMARY OF THE INVENTION

This invention is directed toward satisfying the aforementioned imbalance and oscillation/vibration problems in reproduction of a disc. More particularly, it is an object of the present invention to provide a disc reproducing method and apparatus which assure higher reliability and safety in operation by preventing an excessive oscillation/vibration generated during rotation of an imbalanced disc.

As explained above, when an imbalanced disc is rotated/ reproduced at high reproduction rates (e.g., 8×, 12×), vibration becomes large. In order to combat such problem, when an imbalance vibration is generated and encountered during high speed reproduction at a predetermined rotational speed, vibration can be lowered by reducing and/or increasing the rotational speed (i.e., reproduction rate). More particularly, a lowering of rotational speed substantially lowers an imbalance force (vector 35; FIG. 9), thereby to eliminate the generation of vibration. In contrast, a raising of rotational speed will eventually reach a situation where a mass of the disc, disc/clamp, motor shaft, etc. is too great to move fast enough to follow the high rotational frequency of the imbalance force (vector 35; FIG. 9), thereby avoiding vibration.

Moreover, in order to attain the objects explained above, according to the disc reproducing method of the present invention, information indicating an imbalance (e.g., deviated gravity, eccentricity) of the disc is detected and when smaller than a predetermined value, a disc reproducing operation is performed at a first reproducing rate, and when larger, the disc reproducing operation is performed at a second reproducing rate which is lower than the first reproducing rate.

Therefore, in view of achieving the objects explained above, according to one disc reproducing method and apparatus of the present invention, information about vibration of the disc reproducing apparatus is detected, and when such information indicates a level of vibration smaller than a predetermined value, disc reproducing operation is performed at a normal reproducing rate, and when such information indicates vibration larger than the predetermined value, a disc reproducing operation is performed at a substitute reproducing rate which is different (i.e., lowered or raised) from the normal reproducing rate.

In addition, the disc reproducing apparatus of the present invention comprises, in view of achieving the object explained above, a switching controller for controlling the switching of the disc reproducing rate to the first reproducing rate or the second reproducing rate (i.e., higher or lower second reproducing rate), so as to control the disc reproducing rate to the first reproducing rate when a detected signal from the vibration information detector is smaller than the predetermined value, and to the second reproducing rate when the detected signal is larger than the predetermined value.

Moreover, the disc reproducing apparatus of the present invention further can comprise, in order to achieve the object explained above, a deviated gravity information detector for detecting information about a deviated gravity of a disc, and a switching controller for controlling switching of the disc reproducing rate to the first reproducing rate or to second reproducing rate which is lower than the first reproducing rate, i.e., to set the disc reproducing rate to the first reproducing rate when the detected signal from the deviated gravity information detector is smaller than the predetermined value and to the second reproducing rate when the detected signal is larger than the predetermined value.

In addition, the present invention also comprises a display so that a user can confirm a present state of the arrangement, i.e., as to whether or not an imbalanced condition has been detected, and/or as to whether or not the disc reproducing rate is switched to the second reproducing rate from the first reproducing rate.

Construction according to the present invention enables high speed reproduction, for example, of a 12× (i.e., 12-fold) rate when gravity deviation of disc is judged to be small or when vibration is sufficiently small so as not to represent any problem even under a high reproduction rate, and also enables automatic switching of the disc reproducing rate to an appropriate changed rate depending on a degree of gravity deviation or vibration. More particularly, automatic switching can be provided to switch from a normal desirable 12×speed to a differing (i.e., lower or higher) speed, for example, an 8×speed or 4×speed under control by the switching controller when gravity deviation of disc is judged to be large or when vibration is generated under a present reproduction rate.

Alternative to dynamic detection, a static detection arrangement can be used wherein the quantity of mass eccentricity of a disc which is equivalent to the quantity of displacement between the center of gravity of the disc and the center point of the disc is detected beforehand to automatically warn or inhibit reproduction of the mass eccentric disc at high speed.

In accomplishing the above objects, however, provision of required detectors for detecting the oscillation of a disc reproducer, for detecting the quantity of mass eccentricity of a disc and others do not have to be provided by additional components added to a disc reproducer, i.e., the number of parts, scale and cost of circuits/arrangements of a disc reproducer do not have to be increased as the present invention can be implemented with components already present in disc reproducing apparatus. More particularly, another specific object of the present invention is to provide a mass eccentric disc detecting method which enables detecting the quantity of mass eccentricity of a disc precisely without or only minimally adding equipment to a disc reproducer arrangement.

A further object is to provide a disc reproducer which can provide automatic control so that if the disc is a mass eccentric disc, the rotational speed of the disc is made optimum according to a quantity of mass eccentricity.

To achieve the above object, according to the present invention, a disc is rotated at first rotational speed and at second rotational speed which is faster than the first rotational speed with tracking control stopped, a track crossing signal which is a pulse every time a beam crosses a track on a disc is obtained at differing rotational speeds and the information of the quantity of mass eccentricity of a disc is detected based upon a comparison of track crossing counts at first and second rotational speeds.

As force generating oscillation due to the rotation of a mass eccentric disc is in proportion to the square of the rotational speed of this disc and the quantity of mass eccentricity of the disc, the oscillation of a disc reproducer is increased in proportion to the rotational speed of the disc, and if the above first rotational speed is slow rotational speed to the extent that the disc reproducer is hardly oscillated and the above second rotational speed is high rotational speed at which the disc reproducer is oscillated when a mass eccentric disc is rotated at the rate, in the case of the former the scanning trace of a beam on the disc forms substantially circular trace 90 shown by a dotted line in FIG. 15, however, in the case of the latter, when the condenser is oscillated at the frequency proper to the elastic member holding the condenser, for example the scanning trace forms oval trace 92 shown by a broken line in FIG. 15 because tracking control is not executed and the condenser is free.

If the circular trace 90 and the oval trace 92 are compared, in the case of the former the trace 90 is substantially along a track T because the track T is helical or circular and in the case of the latter, more tracks are crossed, a read signal obtained from a pickup is a pulse signal the frequency of which is high or the shortest cycle of which is short. Therefore, information showing the degree of the mass eccentricity of a disc can be obtained based upon the difference between both described above.

For a concrete method of detecting the information of the quantity of mass eccentricity of a disc according to the present invention, the number of the above pulse signals, that is, track crossing signals at the predetermined number of revolutions is counted or the cycle of this track crossing signal is detected and the above number of pulses, the ratio or the difference of a cycle at the above first and second rotational speed are obtained. The ratio or difference shows the degree of mass eccentricity of a disc.

According to the present invention, it is determined whether the disc is a mass eccentric disc or not based upon the quantity of mass eccentricity detected as described above and the allowable maximum rotational speed of a disc is limited according to the detected quantity of mass eccentricity. Hereby, in a disc reproducer, oscillation can be prevented from being caused.

Further, according to the present invention, the information of the detected quantity of mass eccentricity is displayed on display to let the outside know whether an installed disc is a mass eccentric disc or not.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments at the time the patent application was filed in order to teach one skilled in the art to make and use the invention, it should be clearly understood that the same is by way of illustration and example only and is not to be taken by way of limitation, the spirit and scope of the present invention being limited only by the terms of the appended claims.

BRIEF DESCRIPTION OF THE DRAWING(S)

The following represents brief descriptions of the drawings, wherein.

Figure 16:
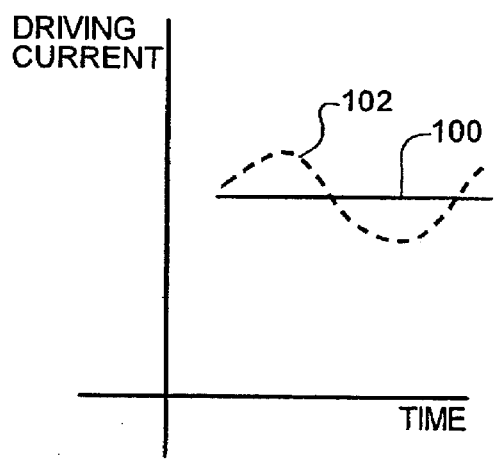

FIG. 16. illustrates an ideal actuator driving current of a disc without and with imbalance.

Figure 17:
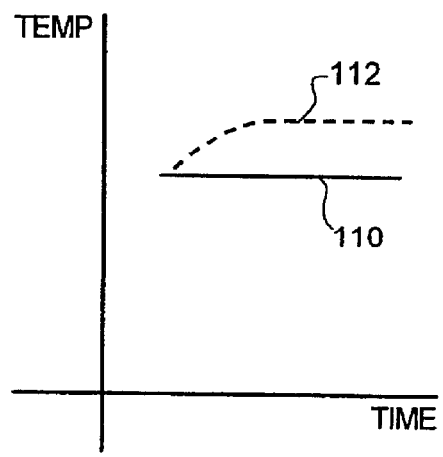

FIG. 17 showing ideal actuator temperature of a disc without and with imbalance.

DETAILED DESCRIPTION OF THE PREFERRED EMBODIMENTS OF THE INVENTION

Before beginning a detailed description of the subject invention, mention of the following is in order:

When appropriate, like reference numerals and characters are used to designate identical, corresponding or similar components in differing figure drawings.

In the description of the preferred embodiments, numeric values are concretely shown; however, such numeric values are only for convenience of description and the present invention is not limited thereto.

Figure 1:
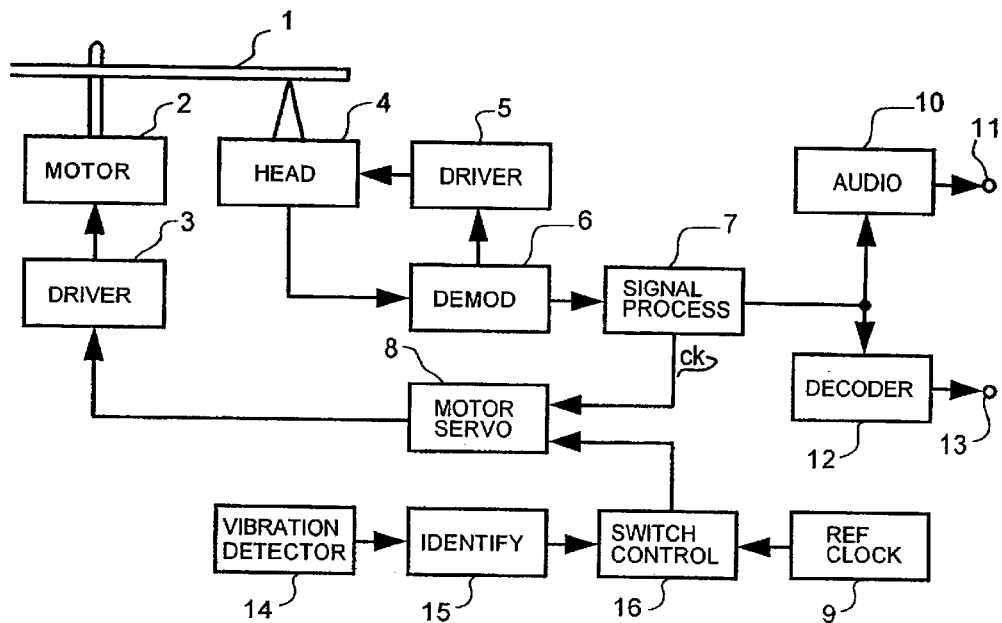
FIG. 1 is a block diagram of an exemplary disc reproducing apparatus of a first embodiment of the present invention.

Turning now to detailed description of the invention, FIG. 1 is a block diagram of a disc reproducing apparatus according to a first embodiment of the present invention. More particularly, in FIG. 1: reference numeral 1 designates a disc; 2, a disc motor; 3, a disc motor driving circuit; 4, an information reader (i.e., head assembly) comprising a transfer arrangement; 5, a transfer driving circuit for controlling and driving the transfer arrangement of the information reader 4; 6, a demodulating circuit for demodulating signals from the information reader 4; 7, a signal processing circuit; 8, a disc motor servo circuit; 9, a reference clock generating circuit; 10, an audio circuit; 11, an audio output terminal; 12, a CD-ROM decoder, 13, a CD-ROM signal output terminal;

14, a vibration detector for detecting vibration of the disc reproducing apparatus; 15, a vibration identifier; 16, a reproducing rate switching controller comprising a frequency dividing circuit for dividing the frequency of the reference clock signal outputted from the reference clock generating circuit 9, and a control circuit for controlling the dividing ratio of the frequency dividing circuit. In this FIG. 1, an audio circuit and CD-ROM decoder, etc. are also shown, although these are not directly related to the subject matter of the present invention.

When a deviated gravity disc having a gravity (mass) point deviated from the center of the disc is reproduced by the disc reproducing apparatus at the higher rate such as a 12×rate, vibration is generated in the disc reproducing apparatus. Vibration gives influence to the information reader 4, but when this influence is within an acceptable range which can be compensated/controlled by the transfer control circuit 5 and disc motor control circuit 8, the information reader 4 converts the information of disc 1 into an electrical signal. This electrical signal is further processed by the demodulating circuit 6, signal processing circuit 7, audio circuit 10 or CD-ROM decoder 12 and the signal is finally outputted from the audio output terminal 11 or CD-ROM signal output terminal 13. However, if vibration is large, operation of the disc reproducing apparatus may be adversely affected (e.g., operate erroneously), and/or be an annoyance to a user.

The vibration detector 14 detects vibration of the disc reproducing apparatus and outputs a signal depending on an amplitude of vibration. This vibration detector 14 is constructed, for example, using an impact voltage converting element, centrifugal force detector, etc. The vibration identifier 15 identifies an output signal of the vibration detector 14, judges whether or not the vibration of the disc reproducing apparatus is sufficiently large to exceed the predetermined value, and if sufficiently large, outputs a control signal to the reproducing rate switching control 16 to reduce the reproducing rate. Responsive to such control signal, the reproducing rate switching control 16 generates a frequency-divided clock signal by dividing the reference clock signal outputted from the reference crock generating circuit 9 with a dividing ratio which depends on the control signal from the vibration identifier 15, and then outputs this frequency-divided clock signal to the disc motor servo circuit 8. The disc motor servo circuit 8 controls the rotating speed of the disc motor 2 via the disc motor driving circuit 3 so that the frequency-divided clock signal matches the clock signal outputted from the signal processing circuit 7. Therefore, the rotating speed of the disc motor 2 is reduced depending on the control signal outputted from the vibration identifier 15.

As mentioned above, a force generated during rotation of the deviated gravity disc which causes vibration of the disc reproducing apparatus is proportional to square of the rotating speed. Therefore, when the reproducing rate of the deviated gravity disc is lowered to a 4×rate, for example, from a 12×rate, the rotating speed is reduced to ⅓ of the 12×rate and thereby the force available for causing vibration is reduced to ⅑. Accordingly the vibration of the disc reproducing apparatus can be reduced.

Figure 2:
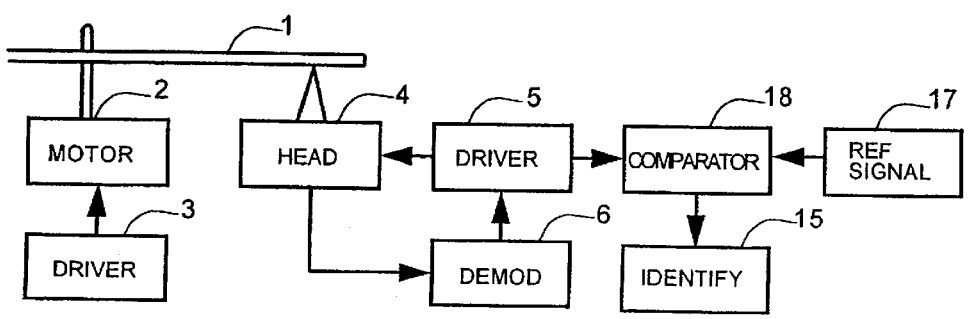
FIG. 2 is a block diagram showing an exemplary structure of a vibration detector arrangement of the present invention.

Turning next to FIG. 2, disclosed is an embodiment of a detector arrangement for detecting information about vibration of the disc reproducing apparatus using a control signal outputted from the transfer/tracking driving arrangement (in place of the vibration detector 4). In FIG. 2, reference numeral 17 designates a reference signal generator which outputs a reference signal which is equal to the control signal outputted from the transfer/tracking driving arrangement when an ideal disc not including any deviated gravity is reproduced. Reference numeral 18 indicates a comparator. When vibration is generated in the disc reproducing apparatus by reproduction of the deviated gravity disc at a higher rate (e.g., 12×), a disturbance is generated in a control signal outputted from the transfer/tracking driving arrangement, a degree of such disturbance depending on an amplitude of vibration. The reference signal generator 17 outputs the reference signal which is identical to an ideal control signal, namely a control signal not including any disturbance, i.e., similar or identical to a signal which would be outputted by the transfer/tracking driving arrangement when an ideal disc not including any deviated gravity is reproduced at such higher rate. The control signal outputted from the transfer/tracking driving arrangement can be either of a driving current or driving voltage of any actuator arrangement within the information reader (i.e., continued oscillatory tracking by an actuator will cause abnormal current or voltage fluctuations), for example, FIG. 16 illustrates an ideal driving current 100 of a disc without imbalance, and an irregular driving current 102 of a disc with imbalance. A measured actuator temperature parameter can also be used (i.e., continued oscillatory tracking by an actuator will generate additional heat as the actuator is having to work harder), with FIG. 17 showing ideal temperature 100 of a disc without imbalance, and an irregular temperature 112 of a disc with imbalance.

Continuing with the description, the reference control signal and the actual control signal (which includes the disturbance due to vibration) are compared with each other in the comparator 18 to detect a level of disturbance of the control signal. Accordingly, such description/illustration shows that it is possible to detect information about vibration of the disc reproducing apparatus using the control signal outputted from the transfer driving circuit 5 (i.e., without the addition of separate detector components). As another arrangement which can detect imbalance without the addition of separate detectors, since disturbance of a control signal due to vibration is also generated in the control signal outputted from the disc motor servo circuit 8 of FIG. 1, it is also possible to detect information about vibration of the disc reproducing apparatus from the control signal outputted from the disc motor servo circuit 8. More particularly, detection of an irregularity in a spindle motor current, voltage and temperature of motor 2 can also be used.

In a dynamic testing approach with the first embodiment explained above, a disc can be initially attempted to be reproduced, for example, at a high rate (e.g., 12×), and upon detection of excessive vibration due to a deviated gravity disc, a reproducing rate of disc can be automatically lowered to reduce the vibration. However, initially assuming a balance condition and initially operating at a high rate (e.g., 12×) may be dangerous/damaging to users and device components. Accordingly, it may be preferable for safety considerations to detect deviated gravity of disc before operating at the high rate, i.e., to initially check for an imbalance condition, and then only authorize activation of a high speed when an imbalance condition is not initially indicated.

Figure 3:
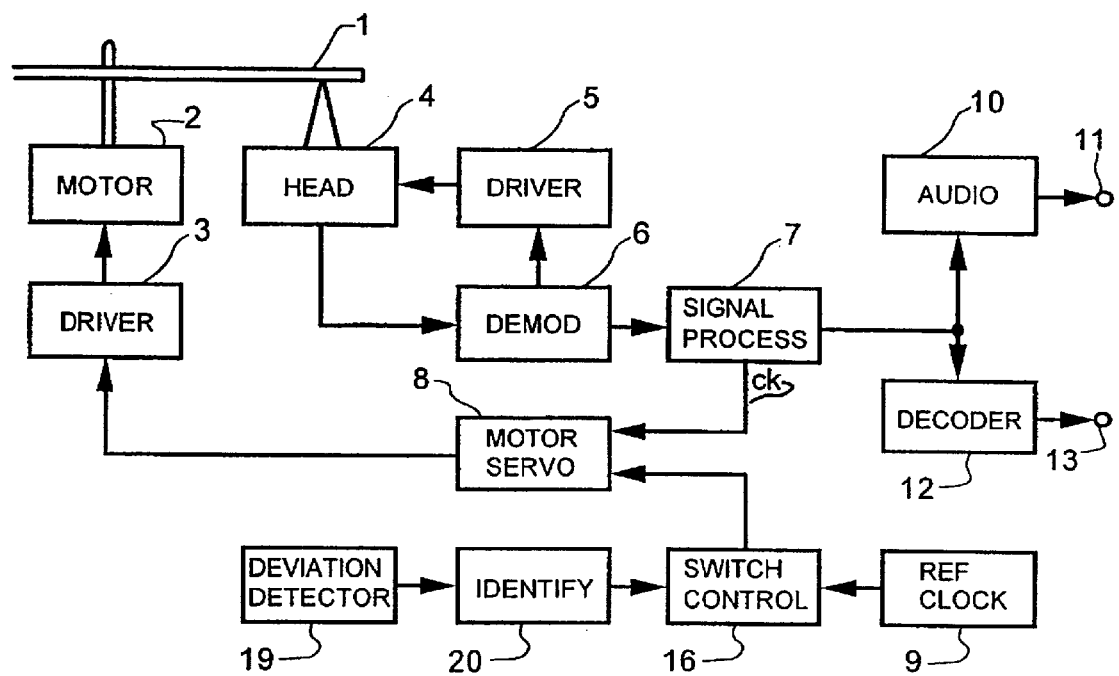
FIG. 3 is a block diagram of an exemplary disc reproducing apparatus of a second embodiment of the present invention.

FIG. 3 shows a second embodiment of the present invention considering the above initial low speed approach. More particularly, in FIG. 3, the reference numeral 19 designates a deviated gravity detector for detecting deviation of gravity of disc 1 and outputting a signal depending on such amount of gravity deviation, and 20 designates a deviated gravity identifier for identifying an output signal from the deviated gravity detector 19. Other portions designated by like reference numerals to those in FIG. 1 indicate like components.

The deviated gravity identifier 20 judges, when the output signal from the deviated gravity detecting 19 exceeds a predetermined value, that a deviation of gravity of disc 1 is large and outputs a control signal to limit a reproducing rate to a lower rate. The reproducing rate switching control 16 limits the dividing ratio of the reference clock signal outputted from the reference clock generating circuit 9 depending on the control signal from the deviated gravity identifier 20. Therefore, the disc reproducing apparatus of the second embodiment does not perform the reproducing operation at a higher rate for the disc 1 when the deviated gravity detector 20 identifies a large deviation of gravity of disc 1. That is, when deviation of gravity of disc 1 is large, the reproducing rate is thus set and limited to a lower rate, and thereby the deviated gravity disc 1 is never reproduced at the rate as high as 12-fold rate and generation of vibration can be prevented.

Figure 4:
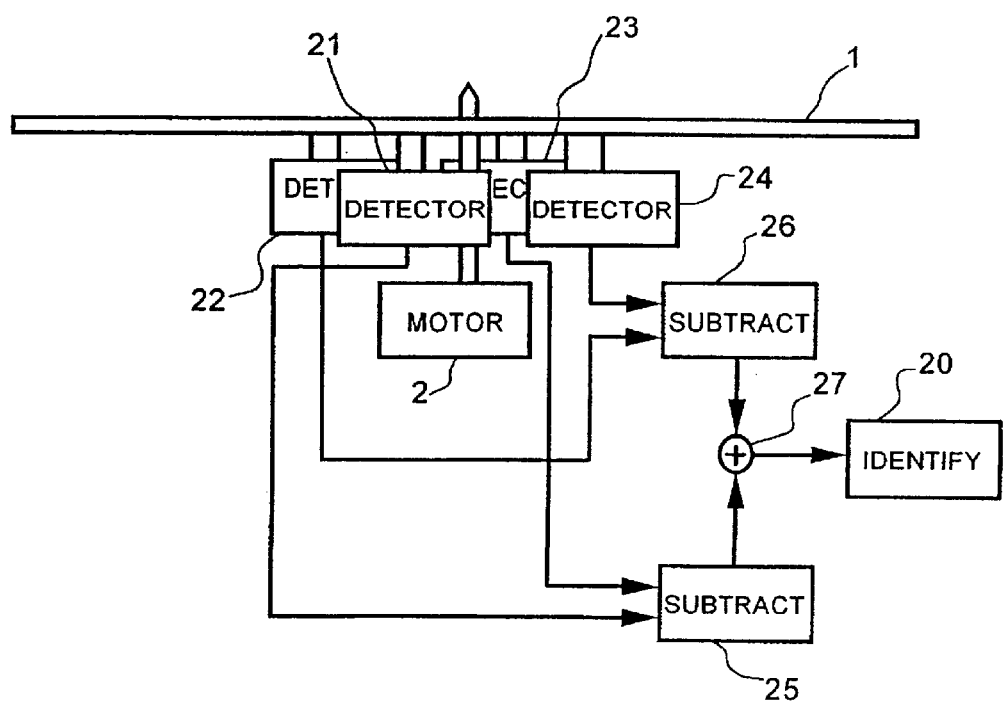
FIG. 4 is a block diagram showing an exemplary structure of a deviated gravity detector arrangement of the present invention.
Figure 5:
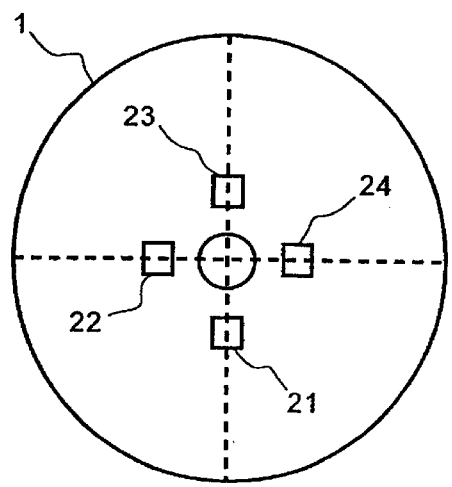
FIG. 5 is a diagram showing an exemplary layout pattern/positioning of weight detectors in an embodiment of the present invention.

The deviated gravity identifier 19 is realized, for example, by the structure of FIG. 4. In FIG. 4: 21 to 24 represent weight detectors for converting weight to a voltage; 25, 26, a subtractors; 27, an adder. Again, portions designated by like reference numerals to those in FIG. 3 indicate like components. As shown in FIG. 5, the weight detectors 21 to 24 are respectively allocated at equal distances from the center of disc 1 on linear axes crossing at a right angle at a center of disc 1. When the disc 1 is placed on the weight detectors 21 to 24, a weight of the disc 1 is distributed on the weight detectors 21 to 24 and these weighs detectors 21 to 24 output voltages corresponding to the weight applied thereto. Pairs of such output voltages are input to the subtractors 25, 26. Since the weight detectors 21 to 24 are allocated at the positions shown in FIG. 5, when gravity deviation of disc 1 is almost zero, an equal weight is applied to the weight detectors 21 to 24. In contrast, when the disc 1 has a certain deviation of gravity, differences are generated in the weights applied to the weight detector 21 to 24. It is noted that the weight detectors 21 to 24 can be used to detect weight imbalance during static testing (i.e., with the disc being stopped) or dynamic testing (i.e., with the disc being rotated).

The subtractor 25 detects a voltage difference outputted from the weight detectors 21, 23, while the subtractor 26 detects a voltage difference outputted from the weight detectors 22, 24. Namely, the subtractor 25 detects amount of gravity deviation of disc 1 in the linear direction (i.e., axis) upon which the weight detectors 21, 23 are allocated, while the subtractor 26 detects amount of gravity deviation of disc 1 in the linear direction (i.e., axis) upon which the weight detectors 22, 24 are allocated. The adder 27 adds the output voltages of the subtractors 25, 26 and outputs a result to the deviated gravity identifier 20. Therefore, the voltage outputted from the adder 27 corresponds to an amount of gravity deviation of the disc 1, and the amount of gravity deviation of disc 1 can be detected with the structure shown in FIG. 4. While in the structure of FIG. 4, four weight detectors are used, differing arrangements such as three or more weight detectors can be used, and with such alternative arrangements, an amount of gravity deviation of disc 1 can also be detected with the same operation principle.

Figure 6:
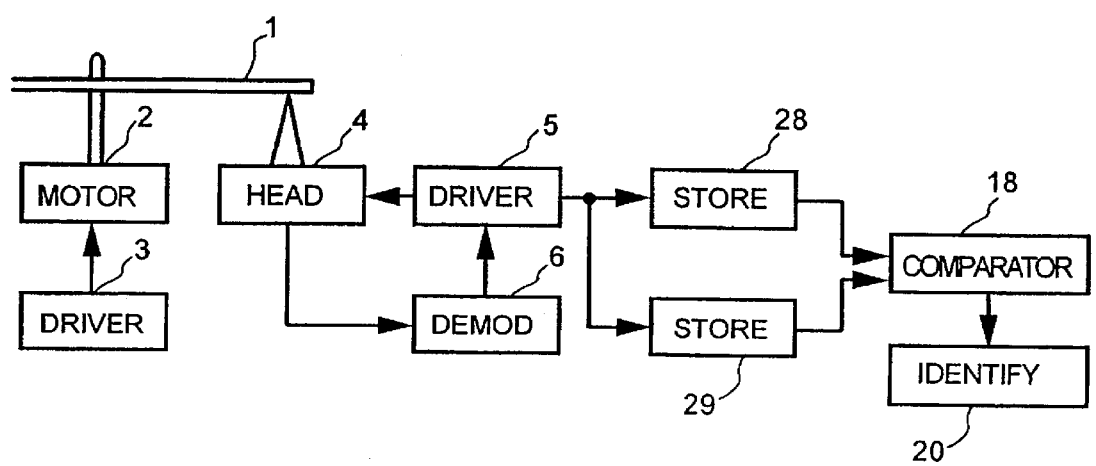
FIG. 6 is a block diagram showing another exemplary structure of a deviated gravity detector arrangement of the present invention.
Figure 7:
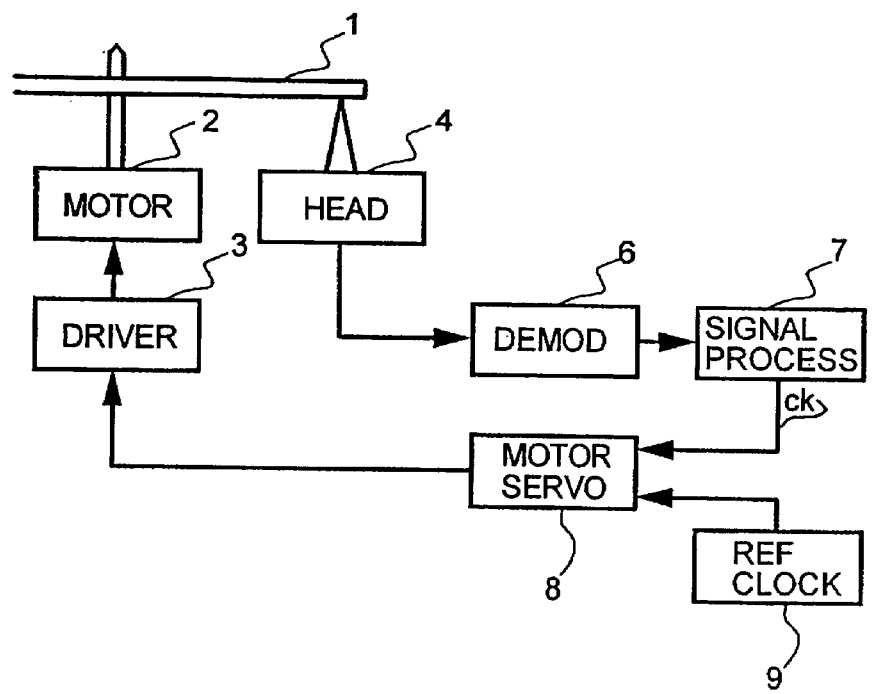
FIG. 7 is a schematic basic block diagram of a background servo system of a disc motor control of the disc reproducing apparatus, for background discussion.
Figure 8:
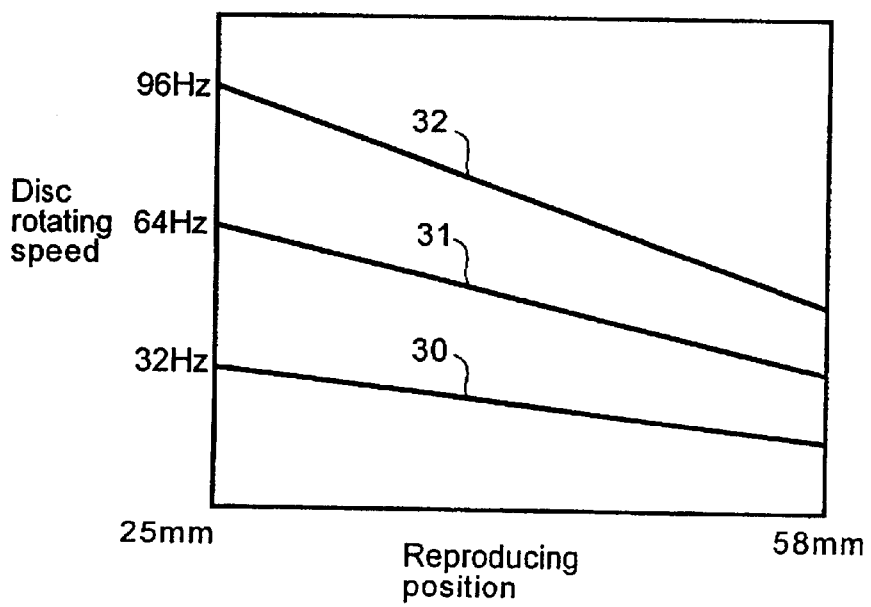
FIG. 8 is a diagram showing a background relationship between a disc reproducing rate multiplication ratio and a disc rotating speed, again for background discussion.
Figure 9:
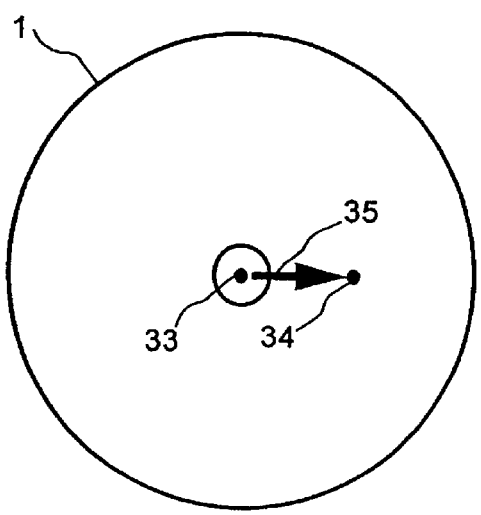
FIG. 9 is a diagram showing a force generated during rotation of a deviated gravity disc, further for background discussion.

Continuing further in discussion, FIG. 6 illustrates an embodiment for detecting information about a deviated gravity of disc 1 using a comparison of parameters measured at at least two differing reproduction speeds. More particularly, in FIG. 6, reference numerals 28, 29 designate control amount stores (i.e., memories or storage arrangements) for storing an amount of control of the transfer arrangement of the information reader 4. As described in the first embodiment, when a deviated gravity disc 1 is reproduced at a higher reproduction rate (e.g., 12×), vibration is generated in the disc reproducing apparatus and the transfer driving circuit 5 controls the transfer arrangement of the information reader 4 depending on the vibration. Accordingly, being directly related to the vibration, an amount of control changes depending on a square of the reproducing rate of the deviated gravity disc 1 and an amount of gravity deviation of disc 1. The control amount store 28 stores an amount of control of the transfer arrangement of the information reader 4 when the disc is reproduced at a lower rate, for example, at a 1×rate, and a control amount store 29 stores an amount of control when the disc 1 is reproduced at a higher rate, for example, a 4×rate. Here, when the disc 1 almost does not have any deviation of gravity, the control amount of the control amount stores 28, 29 is equal, but if the disc 1 has a certain amount of gravity deviation, an amount of control during the 4×reproduction as stored in the control amount store 29 becomes larger than the control amount during the 1×reproduction as stored in the control amount store 28. Therefore, an amount of gravity deviation of the disc 1 can be detected by comparing the control amounts stored in the control amount stores 28, 29 using the comparator 18. Again, as was discussed above with respect to the FIG. 2 arrangement, since a difference of a control amount due to the reproducing rate is also generated in the control signal outputted from the disc motor servo circuit 8, information about a deviated gravity of disc 1 can also be detected by comparing the control signal outputted from the disc motor servo circuit 8 at two (or more) different speeds.

As described above, according to the present invention, a vibration of a disc reproducing apparatus or an amount of gravity deviation of a disc can be automatically detected and the reproducing rate can be automatically controlled depending on the result of such detection. Namely, when the deviated gravity disc 1 is reproduced at a high rate such as 12× and excessive vibration is generated, the reproducing rate is automatically switched from the high 12×rate to, for example, a lower 8× or 6×rate which do not result in any vibration problem. In addition, when amount of gravity deviation is judged large in comparison to a previously detected amount of gravity deviation of the disc, a disc reproducing operation (i.e., data reading) is started only after the reproducing rate has been automatically switched from the 12×rate to the 8× or 6×rate depending on the amount of gravity deviation. Therefore, operation failure of the disc reproducing apparatus and adverse effects on other apparatus installed in the vicinity thereof, resulting from vibration generated during reproduction of a gravity deviated disc at a higher reproducing rate, can be prevented.

Figure 10:
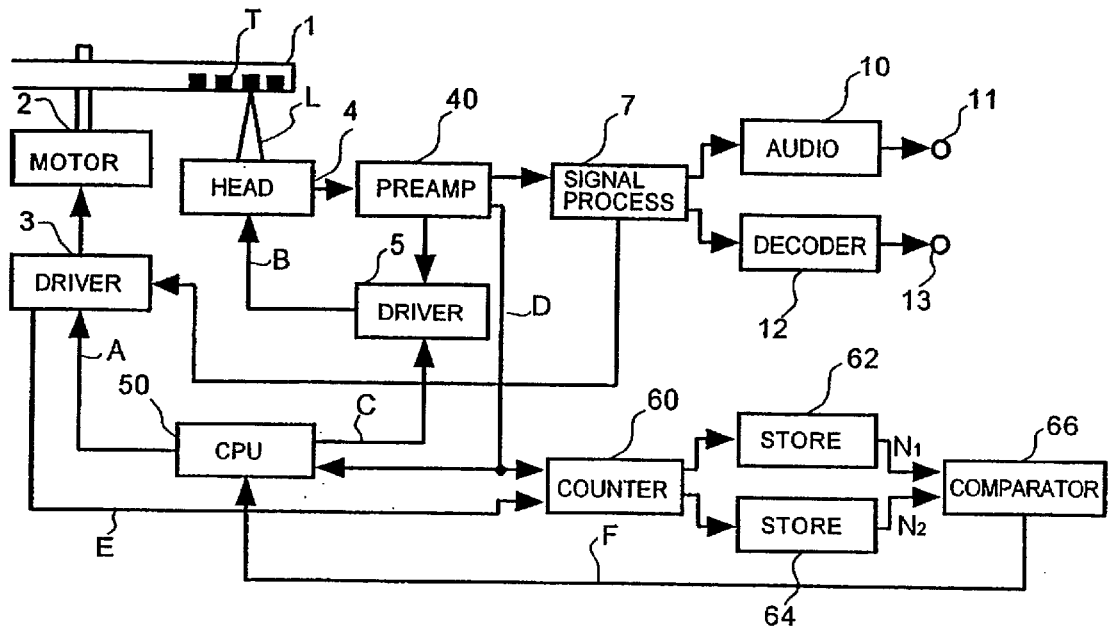
FIG. 10 is a block diagram showing a first embodiment of a mass eccentric disc detecting method and a disc reproducer according to the present invention.

FIG. 10 is a block diagram showing another embodiment of a mass eccentric disc detecting method and a disc reproducer according to the present invention. Within FIGS. 10–13, like reference numerals are used to designate like components from previously discussed Figs. A reference number 60 denotes a counter, 62 and 64 denote storage cells, 66 denotes a comparing circuit. As shown in FIG. 10, the counter 60, the storage cells 62 and 64 and the comparing circuit 66 are newly added to the previously discussed FIG. 14 disc reproducer, so as to detect the information of the quantity of mass eccentricity of a disc 1 using a track crossing pulse D from a preamplifier circuit 40. Operation of such arrangement is now described.

More particularly, before reproduction of the information signal is attempted at a high speed, for example, 8× or 12×, CPU 50 issues an inhibiting signal C to stop the operation of a tracking control circuit 5, and instructs a disc motor control circuit 3 to initially set the rotational speed of the disc 1 to a low speed of approximately a 1× or 2×rate, i.e., by issuing an appropriate instruction A. This first rotational speed is not limited to a 1× or 2×speed, but instead any speed which does not cause oscillation/vibration of the disc reproducer even if the disc 1 is a mass eccentric disc, can be used.

When the disc 1 is rotated at the first rotational speed, that is, at slow speed, a signal (e.g., reflected laser beam) is reproduced from the disc 1 by the information reader 4 and a regenerative signal therefrom is amplified by the preamplifier circuit 40 to be waveform shaped. At least part of the regenerative signal is supplied to the CPU 50 and counter 60 as a track crossing pulse D. The CPU 50 uses the track crossing pulse D to control access to a desired track T on the disc 1.

In the meantime, the counter 60 counts edges of this track crossing pulse D and is reset by a reset pulse E supplied from the disc motor control circuit 3 at every rotation of the disc 1. Therefore, the counter 60 can obtain a number N1 of pulses of a track crossing pulse D for each rotation of the disc 1, and such count value N1 can be stored in the storage cell 62.

Next, CPU 50 issues an instruction A to rotate the disc 1 at high speed to the disc motor control circuit 3. The rotational speed in this case is the one (hereinafter called second rotational speed) which necessarily oscillates the disc reproducer if this disc 1 is a mass eccentric disc, for example, can be an 8× or 12×rate. When the disc is rotated at the second rotational speed, that is, at high speed, as described above, a regenerative signal output from the information reader 4 and amplified/shaped by the preamplifier circuit 40 is again supplied to the counter 60 as a track crossing pulse D. The counter 60 again counts edges of this track crossing pulse D and is reset by a reset pulse E supplied from the disc motor control circuit 3 every rotation of the disc 1. Therefore, while rotation is conducted at the higher speed, the counter 60 can obtain a number N2 of pulses of a track crossing pulse D and the count value N2 can be stored in the storage cell 64.

As described above, when the number Ni of track crossing pulses when the disc 1 is rotated at slow speed is stored in the storage cell 62 and the number N2 of track crossing pulses when the disc 1 is rotated at high speed is stored in the storage cell 64, the numbers N1 and N2 of these pulses can be compared by the comparing circuit 66, and the ratio or difference of these can be obtained. The result F of such comparison is sent to CPU 50.

Figure 15:
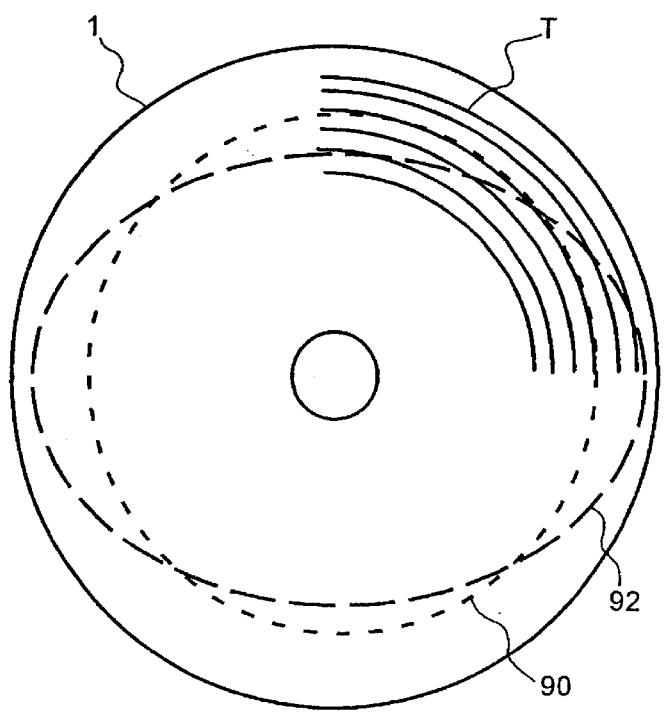
FIG. 15 shows the scanning trace disc according to the quantity of mass eccentricity or a disc when tracking control is not executed.

If the disc 1 is a mass eccentric disc, as described in relation to FIG. 15, a scanning trace of a beam L as the disc 1 rotates at low speed forms a substantially circular trace 90, and therefore, no or a very small number of track crossings occur so that a small track crossing count N1 is stored in the storage cell 62. When a mass eccentric disc 1 is rotated at the second rotational speed, the scanning trace of a beam L forms a substantially oval trace 92, and therefore, a large number of track crossings occur so that a large track crossing count N2 is stored in the storage cell 64. Therefore, the number N2 of track crossing pulses per rotation of the disc 1 stored in the storage cell 64 is larger than the number N1 of track crossing pulses per rotation of the disc 1 stored in the storage cell 62. Therefore, the ratio N2/N1 (which is the result F of comparison by the comparing circuit 66) is larger than 1 or the difference (N2-N1) is positive, and when these values are larger than a preset threshold value, the disc is decided to be a mass eccentric disc.

Figure 11:
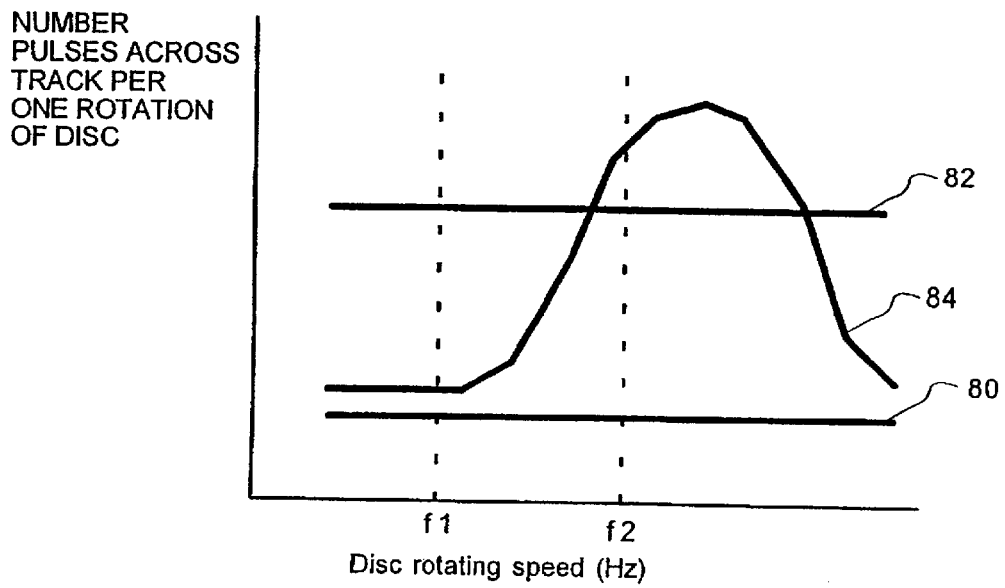
FIG. 11 shows a graph showing the characteristics of the number of track crossing pulses per rotation of a disc for the rotational speed of the disc.

FIG. 11 graphically shows a change of the number of track crossing pulses per rotation, for various rotational speeds of the disc 1. More particularly, characteristic curve 80 show those of a disc having a quantity of eccentricity and quantity of mass eccentricity which are both small, i.e., such characteristic curve 80 shows that a number of track crossing pulses per rotation of the disc is small and remains at a substantially small fixed value independent of a change of rotational speed. Characteristic curve 82 shows those of a disc having a quantity of eccentricity which is large and a quantity of mass eccentricity which is small, i.e., such characteristic curve 82 shows that a number of track crossing pulses per rotation of the disc 1 is large, and again, the number of track crossing pulses is substantially fixed independent of the change of rotational speed.

Characteristic curve 84 shows those of a disc having a quantity of eccentricity of which is small and a quantity of mass eccentricity which is large, i.e., such characteristic curve 84 shows the number of track crossing pulses per rotation of the disc is varied as rotational speed is changed. As described above, the number of track crossing pulses is increased as the rotational speed of the disc is gradually increased and an oscillation frequency generated in the disc reproducer approaches the natural frequency of the transfer function of an elastic member holding the pickup. It is interesting to note that, after rising and reaching a maximum, the number of track crossing pulses then actually decreases as the rotational speed of the disc is further increased. Such decreasing oscillation/vibration occurs because a frequency generated in the disc reproducer moves away from a natural frequency of the transfer function of rotator arrangement and/or the elastic member holding the pickup, i.e., a mass of the rotator arrangement and/or the pickup is too great to follow the rotational frequency of the imbalance (eccentricity).

Continuing in discussion, as shown in FIG. 11, f1 is a first rotational speed wherein mass eccentricity does not cause vibration or increased disc eccentricity along any of the curves 80, 82, 84, and f2 is a second rotational speed wherein it does. As shown in FIG. 11, it can be determined whether the disc 1 is a mass eccentric disc or not by comparing the number N1 of track crossing pulses stored in the storage cell 62 and corresponding to the first rotational speed f1 and the number N2 of track crossing pulses stored in the storage cell 64 and corresponding to the second rotational speed f2. More particularly, if a result F of comparison is larger than a preset threshold value, such result F functions as information showing the degree of mass eccentricity, which the CPU 50 can use to recognize the same.

More specifically, CPU 50 determines whether the currently installed disc 1 is a mass eccentric disc or not based upon the result F of comparison by the comparing circuit 66, and instructs operation at an appropriate reproduction speed. That is, when an result F indicates that a presently installed disc 1 is not a mass eccentric disc, the disc 1 is rotated at a normal rotational speed (e.g., 8× or 12×) according to a request from an external device. However, if the result indicates that the disc 1 is a mass eccentric disc, a maximum rotational speed of the disc 1 is limited according to the result F, independent or regardless of a request from an external device. For example, even if the disc 1 is a CD-ROM and high speed reproduction of 8× is requested, the rotational speed of the disc is limited to high speed reproduction at a 6×speed or less.

As described above, it can be readily and securely determined whether the disc 1 is a mass eccentric disc or not without providing oscillation detector separately, and with such arrangement, information showing the degree of the mass eccentricity of the disc I can be detected, and the maximum rotational speed can be limited according to the quantity of mass eccentricity and the disc reproducer can be prevented from being oscillated.

Figure 12:
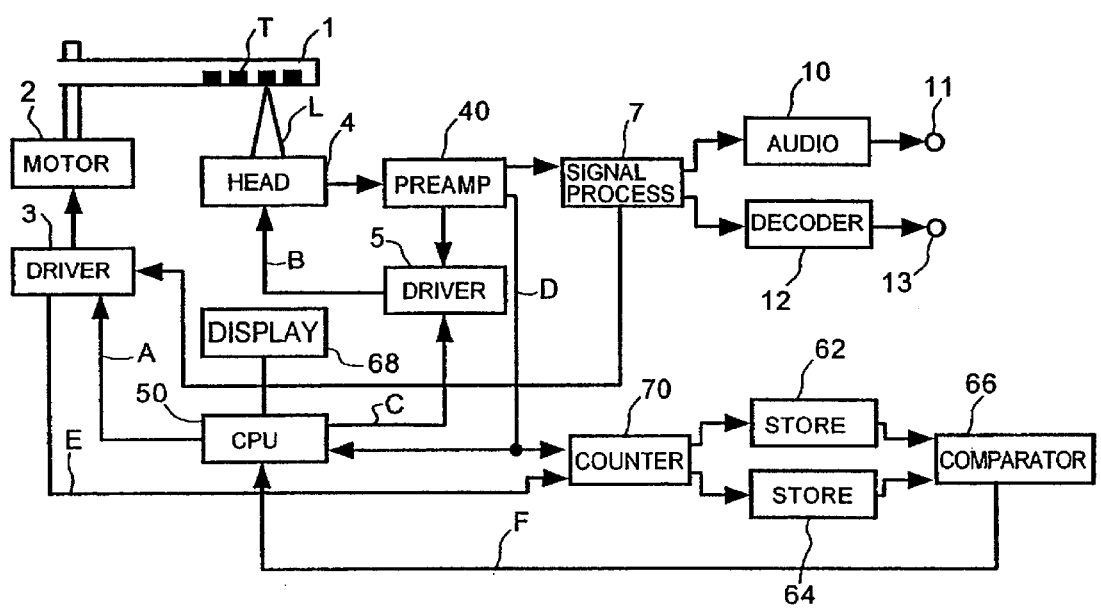
FIG. 12 is a block diagram showing a second embodiment of the mass eccentric disc detecting method and the disc reproducer according to the present invention.
Figure 13:
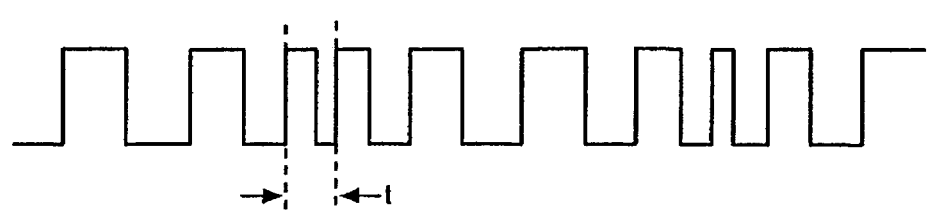
FIG. 13 shows a waveform which example of a track crossing pulse.
Figure 14:
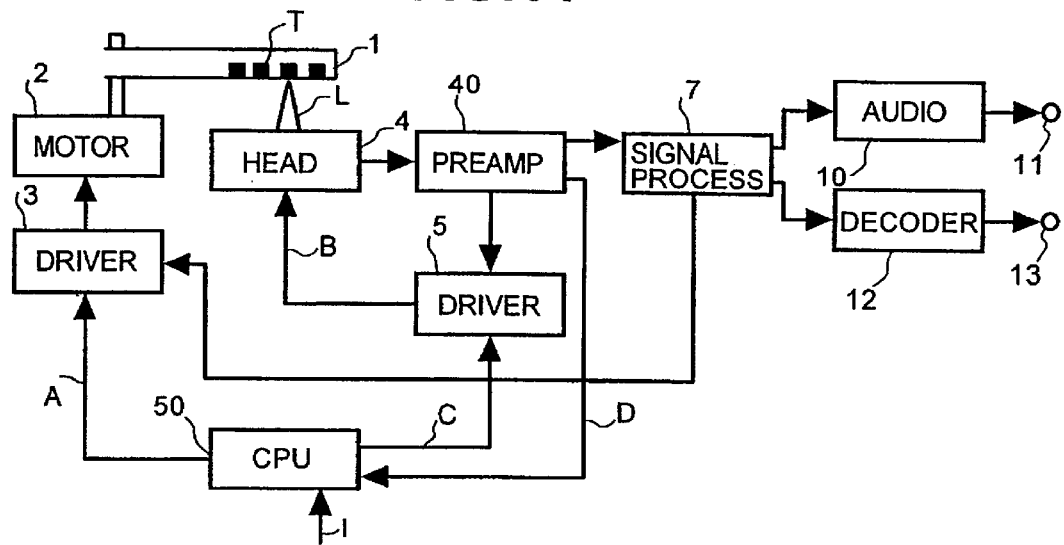
FIG. 14 is a block diagram showing an example of a conventional type disc reproducer.

FIG. 12 is a block diagram showing a second embodiment of a mass eccentric disc detecting method and a disc reproducer according to the present invention. In discussing new components within such FIG., a reference number 70 denotes a shortest cycle detecting circuit. In this embodiment, the shortest cycle detecting circuit 70 is used in place of the counter 60 shown in FIG. 10. A track crossing pulse D is a signal with a compression waveform as shown in FIG. 13 and a shortest cycle t is determined by the number of track crossing pulses per rotation of a disc and the rotational speed of the disc. Therefore, when the rotational speed of the disc 1 is doubled, this shortest cycle t is ½if the number of track crossing pulses per rotation of the disc is not changed and if the disc reproducer is oscillated and the number of track crossing pulses per rotation of the disc 1 is increased, the shortest cycle t is decreased to even smaller than ½.

In the second embodiment shown in FIG. 12, the shortest cycles t1 and t2 of a track crossing pulse D for one rotation of the disc 1 are detected at the respective first rotational speed f1 and the second rotational speed f2 by the shortest cycle detecting circuit 70, and such values are stored in storage cells 62 and 64, respectively. In a comparing circuit 66, the ratio t1/t2 or difference (t1–t2) between these shortest cycles t1 and t2 are obtained. CPU determines whether the disc 1 is a mass eccentric disc or not based upon the result F of such comparison, detects the degree of mass eccentricity and sets the allowable maximum rotational speed of the disc 1 accordingly.

More particularly, if the second rotational speed f2 is 'n' times as fast as the first rotational speed f1, the ratio t1/t2 is approximately 'n' in a case where the disc 1 is not a mass eccentric disc. The difference ($t_1-t_2$) is approximately $t_1$(n−1)/n, however, if the disc 1 is a mass eccentric disc. If a ratio or difference value exceeds a preset threshold value, it can be determined that the disc is a mass eccentric disc and the degree of mass eccentricity can be known from the degree of the ratio or difference.

The shortest cycle detecting circuit 70 detects each cycle as a count value by counting clock pulses of a fixed cycle which occur during, for example a track crossing pulse D. A first count value which is a temporary shortest cycle and a second count value are compared, and the smaller count value is set as a new temporary shortest cycle. Every time a count value is obtained, this count value and a count value set as a temporary shortest cycle are compared, and a smaller count value of the two is selected and held as a new temporary shortest cycle. Such operation is performed for one rotation of the disc 1, and the count value of a finally obtained temporary shortest cycle is stored in the storage cell 62 or 64 as the count value of a true shortest cycle.

As described above, in this second embodiment, the similar effect as in the above first embodiment can be also obtained.

It should also be apparent that in the embodiment shown in FIG. 10, CPU may be provided with the function of a circuit consisting of the counter 60, the storage cells 62 and 64 and the comparing circuit 66, and in the second embodiment shown in FIG. 12, CPU may be also provided with the function of a circuit consisting of the shortest cycle detecting circuit 70, the storage cells 62 and 64 and the comparing circuit 66. With such arrangement, circuit configuration is further simplified and device cost is reduced.

In addition to the above discussions, a display 68 (FIG. 12) for displaying the result of eccentricity determination and/or operational speed can be provided, i.e., so as to let a user know the result of detection and/or adjustment. For example, for such display 68, a graphical display for displaying information showing whether the disc 1 is a mass eccentric disc or not, and information showing allowable maximum rate reproduction (6×, 4×, 1×) set for the disc 1 can be used. Alternatively, the display can be a simple light emitting diode (LED) indicating when it is determined that the disc is a mass eccentric disc. Other types of indication may also or alternatively be provided, for example, an audible indicator.

As described above, according to the present invention, the information of the quantity of mass eccentricity of a disc is detected based upon the result of comparison by rotating the disc with a tracking control disabled, and comparing a number of track crossing pulses generated by reading the disc at different rotational speeds. A mass eccentric disc is detected without adding new components such as oscillation detector, and therefore, such detection can be precisely performed without enlarging the disc reproducer and increasing the cost. As the allowable maximum rotational speed of a mass eccentric disc is controlled according to the detected quantity of mass eccentricity, the disc reproducer can be effectively prevented from being oscillated due to a mass eccentric disc.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention, e.g., the following represents a non-exhaustive list of modifications which might readily be apparent to one skilled in the art to which the present invention is directed:

More particularly, the present invention is equally applicable to constant angular velocity (CAV) arrangements as well as the above described constant linear velocity (CLV) arrangements. Further, while the above description focused mainly on CD and CD-ROM reproducing arrangements, the present invention may be applicable to other types of arrangements (e.g., CD, CD-ROMs, mini-discs, DVD, etc., including any other optical disc types which may be introduced in the future), and may also be applicable to magnetic disc rotating arrangements.

What is claimed is:

1. A disc reproducer for rotating a disc, comprising:
   a detector detecting a condition reflecting an imbalance in a radial direction of said disc; and
   a rotator for rotating said disc in accordance with a result of said detecting, wherein:
      said rotator is more specifically capable of rotating said disc at a normal speed and at least one substitute speed, said at least one substitute speed being different than said normal speed;
      said rotator operating at said at least one substitute speed when said imbalance signal is indicative of a rotational irregularity condition of said disc;

said detector is more specifically a dynamic detector detecting said condition reflecting an imbalance while said disc is rotated;

said detector measuring a parameter of said disc reproducer while said disc is operated at each of a first speed and a second speed, said detector detecting said condition reflecting an imbalance by comparing the parameters obtained as said first and second speeds; and said rotator limiting rotating at said substitute speed when said imbalance signal is indicative of a rotational irregularity condition of said disc.

2. A reproducer as claimed in claim 1, wherein said detector detecting said parameter using at least one of: at least one weight sensor; at least one vibration sensor; at lest one centrifugal force sensor; a track crossing counter; at least one of a spindle motor current, voltage and temperature irregularity detector; and, at least one of an information reader actuator current, voltage and temperature irregularity detector.

3. A reproducer as claimed in claim 1, wherein said rotator more specifically operating at said substitute speed when said imbalance is indicative of a rotational irregularity condition outside of a predetermined acceptable range.

4. A reproducer as claimed in claim 1, wherein said reproducer is more specifically for reproducing at least one of a compact disc (CD), a CD read only memory (CD-ROM), a digital video disc (DVD) and a mini-disc.

5. A disc reproducer for rotating a disc, comprising:

a static detector to detect a condition reflecting a static imbalance in a radial direction of said disc while said disc is not rotating;

a rotator to rotate said disc in accordance with a result of said static detector, wherein said rotator is capable of rotating said disc at a normal speed and at least one substitute speed, said at least one substitute speed being different than said normal speed, and said rotator to switch to said at least one substitute speed when a static imbalance signal indicates a rotational irregularity condition of said disc; and a dynamic detector to measure a parameter of said disc reproducer while said disc is operated at each of a first speed and a second speed and to detect a condition reflecting a dynamic imbalance by comparing the parameters obtained as said first and second speeds, and said rotator switching to said substitute speed when a dynamic imbalance signal indicates a rotational irregularity condition of said disc.

6. A reproducer as claimed in claim 5, wherein said static detector comprises at least one weight detector arranged in a radial direction of said disc, said at least one weight detector detecting an imbalanced weight distribution condition of said disc which would cause at least one of irregular oscillation and vibration in a radial direction of said disc.

7. A reproducer as claimed in claim 6, wherein said rotator more specifically operating at said substitute speed when said static imbalance is indicative of an irregularity condition outside of a predetermined acceptable range.

8. A reproducer as claimed in claim 6, wherein said reproducer is more specifically for reproducing at least one of a compact disc (CD), a CD read only memory (CD-ROM), a digital video disc (DVD) and a mini-disc.

9. A disc reproducing method for rotating a disc comprising the steps of:

detecting a condition reflecting an imbalance in a radial direction of said disc; and rotating said disc with a rotator in accordance with a result of said detecting;

wherein said rotator is more specifically capable of rotating said disc at a normal speed and at least one substitute speed, said at least one substitute speed being different than said normal speed;

said rotating step more specifically rotating at said at least one substitute speed when said imbalance signal is indicative of a rotational irregularity condition of said disc;

wherein said detecting step is more specifically a dynamic detecting step detecting said condition reflecting an imbalance while said disc is rotated;

said detecting step more specifically measuring a parameter of said disc reproducer while said disc is operated at each of a first speed and a second speed, said detector detecting said condition reflecting an imbalance by comparing the parameters obtained as said first and second speeds; and said rotating step more specifically limiting rotating at said substitute speed when said imbalance signal is indicative of a rotational irregularity condition of said disc.

10. A method as claimed in claim 9, wherein said detecting step more specifically detecting said parameter using at least one of: at least one weight sensor; at least one vibration sensor; at lest one centrifugal force sensor; a track crossing counter; at least one of a spindle motor current, voltage and temperature irregularity detector; and, at least one of an information reader actuator current, voltage and temperature irregularity detector.

11. A method as claimed in claim 9, wherein said rotating step more specifically rotating at said substitute speed when said imbalance is indicative of a rotational irregularity condition outside of a predetermined acceptable range.

12. A method as claimed in claim 9, wherein said method is more specifically for reproducing at least one of a compact disc (CD), a CD read only memory (CD-ROM), a digital video disc (DVD) and a mini-disc.

13. A method as claimed in 9, wherein said detecting step is more specifically a static detecting step detecting said condition reflecting an imbalance while said disc is not rotated.

14. A method as claimed in claim 13, wherein said detecting step more specifically uses at least one weight detector arranged in a radial direction of said disc, said at least one weight detector detecting an imbalanced weight distribution condition of said disc which would cause at least one of irregular oscillation and vibration in a radial direction of said disc.

15. A method as claimed in claim 14, wherein said rotating step more specifically rotating at said substitute speed when said imbalance is indicative of a irregularity condition outside of a predetermined acceptable range.

16. A method as claimed in claim 14, wherein said method is more specifically for reproducing at least one of a compact disc (CD), a CD read only memory (CD-ROM), a digital video disc (DVD) and a mini-disc.

* * * * *